METHOD OF DOPING TUNGSTEN OXIDE

Filed Jan. 4, 1963

INVENTORS.
HERMAN R. HEYTMEIJER and
GEORGE H. LOCKWOOD.
BY
W. D. Palmer
ATTORNEY

United States Patent Office 3,284,230
Patented Nov. 8, 1966

3,284,230

METHOD OF DOPING TUNGSTEN OXIDE

Herman R. Heytmeijer, Belleville, and George H. Lockwood, Bloomfield, N.J., assignors to Westinghouse Electric Corporation, Pittsburgh, Pa., a corporation of Pennsylvania Filed Jan. 4, 1963, Ser. No. 249,490
16 Claims. (Cl. 117—100)

Figure 1:
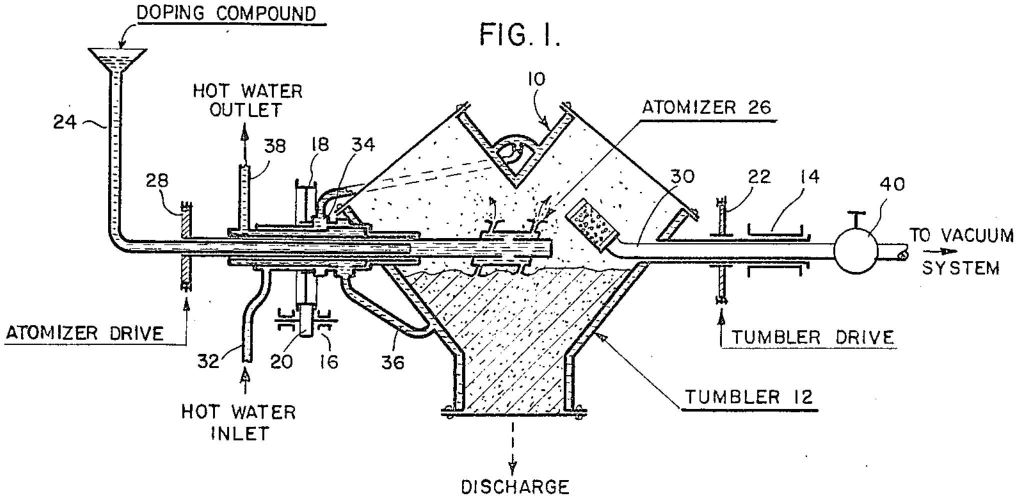

This invention generally relates to preparation of tungsten filamentary wire and, more particularly, to a method for doping tungsten oxide in order that the filamentary wire prepared therefrom has improved characteristics.

Filaments for incandescent lamps are normally formed of coiled or coiled-coil tungsten wire. In the preparation of such tungsten wire, tungsten metal powder is first processed from the ore. During the processing operations and after substantially all impurities have been removed from a tungsten compound, there is added to the tungsten compound a predetermined amount of selected, so-called doping additives. In the practice of the prior art, these doping materials have normally been added when the tungsten, in the form of tungsten acid or oxide, is suspended in a liquid vehicle as a slurry. The usual doping ingredients are a potassium compound such as potassium silicate and potassium chloride, and an aluminum compound such as the chloride. A small portion of these doping additives is retained in the tungsten after it is compacted and sintered and apparently this causes wire drawn from the tungsten to recrystallize with a so-called, non-sag structure, due to elongated, overlapping crystals in the tungsten.

The introduction of the so-called, non-sag tungsten wire greatly improved incandescent lamp performance. There is still some tendency for the tungsten wire to sag, however, and the strength of the wire is not as good as desired. Also, when the normal tungsten wire is subject to impact, it is apt to sag or fail.

It is the general object of this invention to provide a method for adding doping materials to tungsten compound in order that the wire which is fabricated from the doped material will have improved performance characteristics.

It is another object to provide a method for doping tungsten oxide in order that the resulting wire fabricated from the doped material will have improved non-sag characteristics.

It is a further object to provide a method for doping tungsten oxide in order that the wire which is fabricated from the resulting doped material will have improved strength characteristics and a higher temperature of recrystallization.

It is an additional object to provide process details for doping tungsten oxide so that the wire which is fabricated from the doped material will have improved characteristics.

The aforesaid objects of the invention, and other objects which will become apparent as the description proceeds, are achieved by a doping procedure which involves atomizing into the tungsten oxide particles, while agitating same, a predetermined amount of solution which contains a predetermined concentration of selected doping compound dissolved in liquid vehicle. The tungsten oxide particles before doping should be substantially dry and the doping solution is atomized therein in order to insure a uniform distribution of the solution throughout the agitating tungsten oxide particles. In addition, the liquid vehicle portion of the doping solution is present in such amount as to dampen the tungsten oxide particles, but not sufficient to render the tungsten oxide particles sufficiently wet to pelletize. Thereafter, the liquid component of the solution is volatilized from the doped tungsten oxide while the oxide particles are continuously agitated. This leaves a deposit of doping compound uniformly distributed on the finely divided tungsten oxide particles. There is also provided the improved tungsten wire which has been doped in accordance with the present method.

Figure 2:
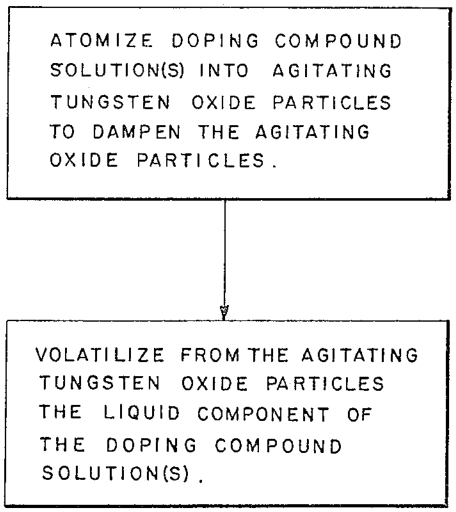

For a better understanding of the invention, reference should be had to the accompanying drawings wherein:

FIGURE 1 is a schematic view of a blender which is suitable for atomizing into agitating, finely divided tungsten oxide particles a predetermined amount of doping material solution; and FIG. 2 is a flow chart setting forth the essential steps of the present invention.

The present invention can be used to dope any type of tungsten oxide which is substantially dry. Tungsten oxide can exist in various form, depending upon the method of preparation. One method for preparing tungsten oxide is first to prepare an ammonium tungstate solution which has an excess of ammonium hydroxide. This solution is adjusted to a pH of about 4.5 to 7.2 by the addition of hydrochloric acid, and at this pH value ammonium paratungstate crystallizes from the solution. The precipitated material is then fired in air at a temperature of approximately 600° C. to produce a yellow tungsten oxide ($WO_3$). As another method for preparing tungsten oxide, the solution which contains the ammonium paratungstate is evaporated to produce a crystallized material. This crystallized material is fired at a suitable temperature in a reducing or protective atmosphere such as hydrogen, nitrogen, or mixtures thereof to convert to what is known as a blue oxide, which has a slight deficiency of oxygen as compared to the yellow oxide. There also exists a brown oxide which has the approximate formulation $WO_2$. All of these oxides can be doped in accordance with the present method, although in making non-sag tungsten, it is preferred to dope the blue oxide as described hereinbefore.

With reference to the drawings, in FIG. 1 is disclosed a blender 10 which generally comprises an agitating or mixing tumbler 12 which is designed to hold the tungsten oxide to be doped. This tumbler 12 is rotatably supported at one side by a conventional sleeve bearing 14 and at the other side by a conventional spider-type bearing 16. The spider bearing comprises a grooved track 18 which rides on a plurality of fixed bearing wheels 20 only one of which is shown in FIG. 1.

The tumbler 12 is adapted to be rotated through a conventional chain-driven sprocket 22 and a typical speed of rotation is eleven r.p.m. The doping material which is to be added in solution form to the tumber 12 is introduced in predetermined amount through the atomizer inlet 24 from which the solution flows to the atomizer 26. In order to insure uniform distribution of this solution throughout the agitated oxide particles, the atomizer is continuously rotated by chain-driven sprocket 28 at a very high rate of speed within the rotating tumber 12, and a typical rotational speed for the atomizer 26 is 1,800 r.p.m.

To facilitate drying after mixing is completed, the atmosphere within the tumbler 12 preferably is evacuated by connection to a conventional vacuum system (not shown) through a vacuum line 30, which is positioned interiorly of and concentric with a supporting shaft for the tumbler 12. The resulting dynamic vacuum greatly facilitates drying of the mixed material.

To further expedite a rapid drying of the solution-doped oxide, hot water or steam is introduced through the inlet line 32 to circulate through the manifold 34, around the jacketed tumbler 12, back through the outlet line 36 and then through the outlet pipe 38. When the valve 40 is opened and hot water or steam circulated through the jacketed tumbler, the simultaneous heating in a dynamic vacuum expedites drying of material in the tumbler 12.

Considering a specific example for preparing doped tungsten which is to be processed into incandescent filaments suitable for general use, the tumbler 12 has a capacity of 10 cubic feet and 650 kilograms of tungsten (blue) oxide are placed into the tumbler. This oxide is finely divided and is substantially dry and has an average particle size of approximately fifteen microns. The tumbler 12 is then rotated and the atomizer 26 is also rotated and an aqueous potassium silicate solution is atomized into the tumbler 12. The rate of addition of this potassium silicate solution is sufficiently slow to insure a substantially uniform distribution over the agitating tungsten oxide particles. For the specific batch size which is being considered, the potassium silicate solution has a ratio of $SiO_2/K_2O$ of 2.45 and this solution is added to the agitating tungsten oxide particles at a rate of approximately five liters per minutes. The solution contains a predetermined concentration of the potassium silicate and for the foregoing operating conditions, the potassium silicate is present in amount of 12.8 percent by weight of the total aqueous solution. The atomization of this solution into the blender is continued for five minutes. Thereafter, to insure uniform distribution of the potassium silicate solution throughout the agitating tungsten oxide particles, the agitation is continued for an additional twenty minutes.

The next doping compound addition is potassium nitrate, which comprises an aqueous solution of potassium nitrate having a predetermined concentration of six percent by weight. This aqueous solution is atomized into the agitating tungsten oxide particles at a rate of approximately 4.3 liters per minutes and atomization is continued for a period of three minutes. After this, agitation of the tungsten oxide particles is desirably continued for an additional twenty minutes to insure uniform distribution.

The third doping addition is aluminum nitrate which is added as an aqueous solution having a concentration of 9.6 percent by weight of aluminum nitrate. The rate of addition is approximately five liters per minute and atomization into the agitating tungsten oxide particles is continued for a period of five minutes. Thereafter the tungsten oxide particles are agitated for an additional twenty minutes to insure uniform distribution of all of the doping ingredients throughout the tungsten oxide particles. This additional agitation has the further advantage that any chemical reactions which take place on the surface of the tungsten oxide particles are allowed to go to completion. This completes the doping additive steps.

In order to volatilize the liquid vehicle component of the doping solutions, while still maintaining the uniform distribution of the doping compounds, the agitation of the tungsten oxide particles is continued by rotating the tumbler 12, and the atmosphere within the tumbler 12 is evacuated by opening the connecting valve 40 and creating a vacuum within the tumbler 12 of about twenty-nine inches of mercury. Simultaneously, hot water or steam is introduced through the inlet 32 to flow through the jacketed tumbler to raise the temperature within the tumbler to approximately 180° F. for example. The dynamic vacuum and the relatively high temperature facilitate a rapid drying of the doped tungsten oxide particles. For a batch size as given hereinbefore, drying is normally accomplished in approximately 240 minutes.

The total amount of aqueous vehicle which is introduced into the tumbler 12 during the solution doping operation has been found to be quite critical. As a general rule, the total amount of vehicle should be sufficient to dampen the tungsten oxide particles, but should not be so great as to cause the tungsten oxide particles to pelletize, that is, to cause the particles to form into small pellets within the tumbler 12. As a practical matter, after the doping is completed, but before any of the vehicle has been evaporated, the moisture content of the doped tungsten oxide particles should be from two percent to seventeen percent by weight of the tungsten oxide. When the moisture content is less than two percent the tungsten oxide particles will not be dampened to any appreciable degree and the doping will not be uniformly distributed on the particles. At greater than seventeen percent, there will be some tendency for the oxide particles to pelletize. A slurry may be formed if the moisture content is increased still more, which will result in non-uniform distribution of the doping compound. The preferred moisture content, after doping, is about ten percent by weight. It should be noted that in the practices of the prior art, the conventional method for doping has been to add the doping constituents to a slurry of tungstic acid or tungstic oxide. On evaporation, however, the resulting material is not uniformly doped. Of course, in order to dampen the tungsten oxide particles, the vehicle which is used should be capable of wetting the tungsten oxide particles. From the standpoint of cost and convenience, water is the preferred vehicle, although other liquids could be used in place of the water, if desired.

For forming so-called thoriated wire, 400 kilograms of the yellow tungsten oxide are placed into a blender having a capacity of ten cubic feet. The particle size of the yellow oxide is approximately four microns. The tungsten oxide particles are agitated as hereinbefore and thorium nitrate in aqueous solution is atomized into the agitating tungsten oxide particles at a rate of approximately 2.7 liters per minute. For making one percent thoriated tungsten, the thorium nitrate constitutes 12.4 percent by weight of the doping solution. For making thoriated tungsten having an increased concentration of thoria, the thorium nitrate constitutes 21.3 percent by weight of the solution. In either case, atomization is continued for a period of fifteen minutes. Thereafter, the tungsten oxide particles are agitated for another one minute, then dried at a temperature of 180° F. under a vacuum of 29 inches of mercury for a period of approximately 240 minutes with constant rotation of the tumbler.

After doping and drying, the doped tungsten oxide is removed from the blender and converted to tungsten metal powder in accordance with conventional practices by heating in a hydrogen atmosphere. The tungsten metal powder is thereafter compacted into a self-sustaining compact using conventional pressure-compacting techniques. The resulting compact is presintered, self-resistance sintered, swaged and then drawn into wire of the desired size, in accordance with conventional practices.

Following are empirical test data taken on a large number of lamps. This data compares the "sag under impact" performance for specific lamps which were identical in construction except for the source of filament wire. Lamps utilizing doped tungsten of the present invention are referred to as "blender doped." Lamps utilizing otherwise identical tungsten, except that it was slurry doped, are identified as "slurry doped (1)." Lamps utilizing tungsten which was purchased on the open market, and presumed to be slurry doped, are identified as "slurry doped (2)." As shown in the following Table I, the sag performance of lamps utilizing tungsten doped in accordance with the present method is vastly superior to the performance of the lamps utilizing the other indicated material, with 67.3 percent of the filaments showing "minimum sag" as compared to the other filaments, and only 32.7 percent falling into the category of "intermediate sag."

TABLE I.—LAMP IMPACT TESTS—ROTARY DRUM TESTER

| Source of Filament Material | Percent Sag Under Impact | | |
|---|---|---|---|
| | Minimum Sag | Intermediate Sag | Maximum Sag |
| Blender doped | 67.3 | 32.7 | |
| Slurry doped (2) | 36.5 | 57.2 | 6.3 |
| Slurry doped (1) | 11 | 66 | 23 |

In tungsten filamentary wire, it is normally desirable to have as high a recrystallization temperature as possible. In explanation of this term, the tungsten wire is processed by first forming the doped tungsten metal powder. Thereafter, the powder is compacted and then sintered. During sintering, some incipient crystals are formed and these are broken up and elongated during the wire-forming, swaging and drawing operations. Thereafter, when the wire is incandesced, it is recrystallized by the temperature of incandescence, and in the case of non-sag wire, the crystals are elongated and interlocking. The wire is much stronger before recrystallization and for this reason, it is normally desirable to have as high a recrystallization temperature as possible. In the following Table II are given recrystallization temperatures for the blender doped wire of the present invention, the otherwise similar material but prepared in accordance with conventional slurry doping, and the otherwise similar material purchased on the open market, which is presumably slurry doped.

TABLE II.—RECRYSTALLIZATION TEMPERATURE

| Source of Material | Temp. required to initiate formation of nonsag structure in 50% of the metal—Temp. in ° C. |
|---|---|
| Blender doped | 2,340-2,570 |
| Slurry doped (1) | 1,800-2,100 |
| Slurry doped (2) | 2,260 |

Another desired quality of lamps, and particularly sealed-beam lamps, is the resistance of the filament to failure under impact. In testing fifty watt sealed-beam lamps, the lamps burn intermittently through a cycle of twenty-five minutes on-five minutes off-etc. During this burning cycle, the lamps receive 700 impacts per minutes, with each impact constituting a drop of 0.12 inch. The average time to filament failure for a large group of lamps is noted and this comprises an accurate measure of the resistance of the filament to impact. In the following Table III are listed the impact performance characteristics of lamps incorporating filament wire prepared from the present doped material and for lamps incorporating otherwise similar wire but purchased on the open market, identified as "slurry doped (2)." As shown in this table, the superiority of the wire prepared in accordance with the present doped material is clearly evident.

TABLE III.—IMPACT TESTS
[For 50 watt sealed-beam lamps]

| Source of material: | Average time to filament failure, minutes |
|---|---|
| Blender doped | 142 |
| Slurry doped (2) | 110 |

In the case of thoriated tungsten prepared in accordance with the present invention, the uniform distribution of the doping provides for improved consistency of performance for lamps incorporating the resulting wire.

The present method is subject to some variation. For example, when volatilizing the liquid vehicle portion of the doping solution from the doped material, drying could be accomplished with forced hot air, using a so-called cyclone separator to recover any material blown from the blender. Also, while specific examples have been given for particular batch sizes and tungsten oxides, it should be pointed out that the optimum batch size will depend upon the capacity of the doping vessel and the physical state of the tungsten oxide powder. For example, brown, blue and yellow tungsten oxides made by the firing of precipitated or crystallized ammonium paratungstate absorb moisture from the vehicle of the doping solution and tend to fluff to greater than the original dry volume. Tungsten oxide prepared from heating tungstic acid, however, tends to absorb the liquid vehicle of the doping solution and assume a volume which is less than that of the same material when in the dry state.

While it is preferred to dope tungsten oxide particles which initially are substantially dry, some moisture can be tolerated in the tungsten oxide particles before doping in accordance with the present invention. In such case, however, the total amount of moisture in contact with the tungsten oxide particles after doping is completed, but before the moisture is volatilized, should be sufficient to dampen the particles but not sufficient to cause the particles to pelletize, just as in the case where the tungsten oxide particles initially are substantially dry.

While the foregoing specific examples of doping compounds are nitrates, potassium chloride could be substituted for potassium nitrate, and aluminum chloride could be substituted for aluminum nitrate, if the blender were constructed of materials which were not corroded by chlorides. Preferably the blender is constructed of stainless steel, which is quite resistant to nitrates, so it is preferred to use nitrate doping compounds.

Other potassium-containing, silicate-radical-containing and aluminum-containing compounds can be substituted as doping compounds for those compounds specified hereinbefore. In the case of thoriated tungsten, other thorium compounds, which when heated will convert to thorium oxide, can be substituted as a doping constituent for the thorium nitrate.

Apparently the superiority of wire which is doped in accordance with the present invention can be attributed to the uniform distribution of the doping materials, with resulting homogeneity of the processed wire. While it was normally thought that a solution doping approach, such as is used in the slurry-doping process of the prior art, would give the best distribution of additive doping materials, this apparently is not the case. Whatever the exact explanation, the wire which has been doped, during processing, in accordance with the present invention is clearly superior.

It will be recognized that the objects of the present invention have been achieved by providing an improved process for doping tungsten so that the resulting wire will have improved performance characteristics, including improved non-sag characteristics, improved resistance to impact, and improved recrystallization temperature. There have also been provided details for carrying out the method of the present invention, as well as the resulting wire.

While best examples have been illustrated and described hereinbefore, it is to be particularly understood that the invention is not limited thereto or thereby.

We claim as our invention:

1. The method of doping finely divided tungsten oxide particles with a predetermined amount of selected doping compound in order that incandescible tungsten filamentary wire prepared by powder metallurgy techniques from the resulting doped tungsten oxide will have improved performance characteristics, which method comprises:

(a) atomizing into said tungsten oxide particles while agitating same, a predetermined amount of solution containing a predetermined concentration of selected doping compound dissolved in liquid vehicle, with the rate of solution atomization into said agitating tungsten oxide particles being sufficiently slow to insure uniform distribution of said solution throughout said agitating tungsten oxide particles, and with the total liquid in contact with said tungsten oxide particles after atomization of all doping compound solutions being sufficient to dampen said tungsten oxide particles but not rendering said tungsten oxide particles sufficiently wet to pelletize same; and (b) thereafter volatilizing the liquid component of said solution from said tungsten oxide particles while continuing to agitate same to leave a deposit of doping compound uniformly distributed on said finely divided tungsten oxide particles.

2. The method of doping finely divided, substantially dry tungsten oxide particles with a predetermined amount of selected doping compound in order that incandescible tungsten filamentary wire prepared by powder metallurgy techniques from the resulting doped tungsten oxide will have improved performance characteristics, which method comprises:

(a) atomizing into said tungsten oxide particles while agitating same independently of any agitation due to such atomization, a predetermined amount of solution containing a predetermined concentration of selected doping compounds dissolved in liquid vehicle, with the rate of solution atomization into said agitating tungsten oxide particles being sufficiently slow to insure uniform distribution of said solution throughout said agitating tungsten oxide particles, and with the liquid vehicle portion of said solution dampening said tungsten oxide particles but not rendering said tungsten oxide particles sufficiently wet to pelletize same; and (b) thereafter volatilizing the liquid component of said solution from said tungsten oxide particles while continuing to agitate same to leave a deposit of doping compound uniformly distributed on said finely divided tungsten oxide particles.

3. The method of doping finely divided, substantially dry tungsten oxide particles with a predetermined amount of selected doping compound in order that incandescible tungsten filamentary wire prepared by powder metallurgy techniques from the resulting doped tungsten oxide will have improved performance characteristics, which method comprises:

(a) agitating a predetermined amount of the finely divided tungsten oxide particles to be doped;

(b) atomizing into said agitating tungsten oxide particles, a predetermined amount of solution containing a predetermined concentration of selected doping compound dissolved in liquid vehicle which will wet tungsten oxide particles, with the rate of solution atomization into said agitating tungsten oxide particles being sufficiently slow to insure uniform distribution of said solution throughout said agitating tungsten oxide particles, and with the liquid vehicle portion of said solution constituting from two to seventeen percent by weight of said agitating tungsten oxide particles; and (c) thereafter volatilizing the liquid component of said solution from said agitating tungsten oxide particles to leave a deposit of doping compound uniformly distributed on said finely divided tungsten oxide particles.

4. The method as specified in claim 3, wherein the liquid vehicle portion of said solution constitutes about ten percent by weight of said agitating tungsten oxide particles.

5. The method as specified in claim 3, wherein the liquid component of said solution is volatilized from said agitating tungsten oxide particles by agitating said tungsten oxide particles in a dynamic vacuum while simultaneously heating said tungsten oxide particles.

6. The method as specified in claim 3, wherein said solution comprises an aqueous solution of thorium compound which when heated converts to thorium oxide.

7. The method as specified in claim 6, wherein said thorium compound is thorium nitrate.

8. The method as specified in claim 3, wherein said solution is an aqueous solution containing different selected doping compounds each present in predetermined concentration.

9. The method as specified in claim 8, wherein said aqueous solution contains in predetermined concentration potassium nitrate, potassium silicate, and aluminum nitrate.

10. The method of doping finely divided, substantially dry tungsten oxide particles with a predetermined amount of selected doping compounds in order that incandescible tungsten filamentary wire prepared by powder metallurgy techniques from the resulting doped tungsten oxide will have improved performance characteristics, which method comprises:

(a) sequentially atomizing into said tungsten oxide particles while agitating same independently of any agitation due to such atomization, a predetermined amount of solutions containing predetermined concentrations of different selected doping compounds dissolved in liquid vehicle, with the rate of solution atomization into said agitating tungsten oxide particles being sufficiently slow to insure uniform distribution of said solutions throughout said agitating tungsten oxide particles, and with the liquid vehicle portion of said solutions dampening said tungsten oxide particles but not rendering said tungsten oxide particles sufficiently wet to pelletize; and (b) thereafter volatilizing the liquid component of said solutions from said tungsten oxide particles while continuing to agitate same to leave a deposit of doping compounds uniformly distributed on said finely divided tungsten oxide particles.

11. The method of doping finely divided, substantially dry tungsten oxide particles with a predetermined amount of selected doping compounds in order that incandescible tungsten filamentary wire prepared by powder metallurgy techniques from the resulting doped tungsten oxide will have improved performance characteristics, which method comprises:

(a) agitating by tumbling a predetermined amount of the finely divided tungsten oxide particles to be doped;

(b) sequentially atomizing into said agitating tungsten oxide particles, a predetermined amount of solutions containing predetermined concentrations of different selected doping compounds dissolved in liquid vehicle which will wet tungsten oxide particles, with the rate of solution atomization into said agitating tungsten oxide particles being sufficiently slow to insure uniform distribution of said solutions throughout said agitating tungsten oxide particles, and with the total liquid vehicle portion of said solutions constituting from two to seventeen percent by weight of said agitating tungsten oxide particles; and (c) thereafter volatilizing the liquid component of said solutions from said agitating tungsten oxide particles to leave a deposit of doping compounds uniformly distributed on said finely divided tungsten oxide particles.

12. The method as specified in claim 11, wherein the total liquid vehicle component of said solutions constitutes about ten percent by weight of said agitating tungsten oxide particles.

13. The method as specified in claim 11, wherein between sequential sprayings of each solution into said agitating tungsten oxide particles, there is permitted to elapse a predetermined period of time during which the agitation of said tungsten oxide particles is continued to insure uniform completion of any chemical reactions on the surfaces of said tungsten oxide particles.

14. The method as specified in claim 13, wherein volatilization of the liquid component of said doping solutions from said agitating tungsten oxide particles is facilitated by agitating said tungsten oxide particles in a dynamic vacuum while simultaneously heating said tungsten oxide particles.

15. The method as specified in claim 11, wherein first a potassium silicate aqueous solution in concentration of 12.8% by weight is atomized into said tungsten oxide particles, thereafter a potassium nitrate aqueous solution in concentration of 6% by weight is atomized into said tungsten oxide particles, and finally an aluminum nitrate aqueous solution in concentration of 9.6% by weight is atomized into said tungsten oxide particles.

16. The method as specified in claim 15, wherein between sequential sprayings of each solution into said agitating tungsten oxide particles, there is permitted to elapse a predetermined period of time during which the agitation of said tungsten oxide particles is continued.

References Cited by the Examiner

UNITED STATES PATENTS

| | | | |
|---|---|---|---|
| 949,010 | 2/1910 | Von Unruh | 252—492 |
| 1,569,095 | 1/1926 | Laise | 252—515 |
| 2,204,391 | 6/1940 | Allen | 252—515 |
| 2,993,469 | 7/1961 | Tarpley et al. | 117—100 |
| 3,112,220 | 11/1963 | Heiser et al. | 117—100 |
| 3,210,589 | 10/1965 | Mason | 75—207 |

WILLIAM D. MARTIN, *Primary Examiner.*

S. W. ROTHSTEIN, *Assistant Examiner.*